(12) United States Patent
Horikiri et al.

(10) Patent No.: US 7,257,768 B2
(45) Date of Patent: Aug. 14, 2007

(54) PROJECT MANAGEMENT SYSTEM

(75) Inventors: Kazunori Horikiri, Tokyo (JP); Hitoshi Abe, Tokyo (JP)

(73) Assignee: Fuji Xerox, Co., Tokyo (JP)

( * ) Notice: Subject to any disclaimer, the term of this patent is extended or adjusted under 35 U.S.C. 154(b) by 473 days.

(21) Appl. No.: 10/846,695

(22) Filed: May 17, 2004

(65) Prior Publication Data

US 2005/0010864 A1 Jan. 13, 2005

(30) Foreign Application Priority Data

Jun. 2, 2003 (JP) .......................... P.2003-156723

(51) Int. Cl.
*G06F 15/00* (2006.01)
*G06F 17/30* (2006.01)

(52) U.S. Cl. ...................... 715/511; 707/100

(58) Field of Classification Search ................ 715/511; 707/3, 100, 101
See application file for complete search history.

(56) References Cited

U.S. PATENT DOCUMENTS 7,043,486 B2 * 5/2006 Cope .......................... 707/100
2003/0079180 A1 * 4/2003 Cope .......................... 715/511
2004/0117358 A1 * 6/2004 von Kaenel et al. ............ 707/3

* cited by examiner

*Primary Examiner*—Don Wong
*Assistant Examiner*—Hung Tran Vy
(74) *Attorney, Agent, or Firm*—Oliff & Berridge, PLC.

(57) ABSTRACT

A project management system including a record system that records, for each project involving a plurality of users, communication history information containing information determining a communication occurrence time point of a user involved in the project, document history information containing information determining an occurrence time point of operation on a document relating to the project, and access history information containing information determining an occurrence time point of access to the document or a communication message relating to the project as distinguished from each other, a collecting unit that collects a record concerning an attention project from the record system, and an image generating unit that generates an image indicating a record frequency of the communication history information, the document history information, and the access history information in the time-series relationship based on the record collected by the collecting unit. Preferably, the generated image is presented to the user.

18 Claims, 8 Drawing Sheets

PROJECT MANAGEMENT SYSTEM

BACKGROUND OF THE INVENTION

1. Field of the Invention

This invention relates to a project management system for managing a plurality of projects developed in an enterprise.

2. Background Art

In recent years, what knowledge management should be in an enterprise, etc., has been suggested. According to the suggestion, it is said that knowledge management of the type wherein knowledge is simply stored and each employee learns the stored knowledge subjectively is not necessarily efficient and that it is essential to promote action in cooperation with each other and share the knowledge among the employees aggressively. It is also said that knowledge management of the type wherein sharing the knowledge among the employees is promoted by staff exclusively involved in the job (called dedicated facilitator), although the required resources grow, rather than simply sharing the knowledge among the employees involved in their separate jobs is efficient and that this method is adopted by a large number of enterprises succeeding in business.

The number of enterprises learning the sufficient knowledge management from the enterprises succeeding in business and introducing the knowledge management is on the increase with the suggestion as a backdrop. For example, such an enterprise also puts enterprise's energies into introducing a system, such as groupware, wherein the employees register their own documents for a keyword search and developing human resources of staff corresponding to the dedicated facilitator and forming the organization.

SUMMARY OF THE INVENTION

However, the document management systems and groupware in related arts can support not necessarily sufficiently the job of the dedicated facilitator.

That is, the dedicated facilitator promotes sharing and efficient use of knowledge in such a manner that the dedicated facilitator offers the past case similar to and overcoming a specific problem that one project faces (for example, obstacle on product development, etc.) to the personnel belonging to the project having the problem, for example; however, if the document management system or groupware in the related art retains communication records (electronic mail records, message board records, etc.) and records of documents (documents concerning problem solution proposals, etc.) concerning specific circumstances as the specific problem, the document management system or groupware provides only a keyword search, etc., and therefore it is virtually difficult to find out the record corresponding to the circumstances.

That is, to find out the record corresponding to the circumstances, often a search must be made with a keyword concerning the problem proper to each project. For example, assuming that when a technical problem of demand for miniaturization exists on development of a digital camera, a record of solving the problem by referencing the document of competition exists, the knowledge corresponding thereto is knowledge that "referencing patent documents is effective for solving technical problem."

However, to offer the record of referencing the patent document of competition to the project facing some technical problem and provide the above-mentioned knowledge, for example, if the above-mentioned history is referenced, unless a search is made with a keyword of "miniaturization" under the understanding that the technology of "miniaturization" is indispensable for "digital camera," often the above-mentioned record cannot be found out; it is virtually difficult to search for the record as described above.

In small-to-medium-sized enterprises, often it is difficult to post an employee to a dedicated facilitator, and they are penalized from the aspect of knowledge management.

It is therefore an object of the invention to provide a project management system for supporting the job of a dedicated facilitator and when the user searches for the past record instead of the dedicated facilitator, facilitating the operation.

To the end, according to one aspect of the invention, there is provided a project management system a record system that records, for each project in which a plurality of users are involved, communication history information containing information determining a communication occurrence time point of a user involved in the project, document history information containing information determining an occurrence time point of operation on a document relating to the project, and access history information containing information determining an occurrence time point of access to the document or a communication message relating to the project as distinguished from each other, a collecting unit that collects a record concerning an attention project from the record system, and an image generating unit that generates an image indicating a record frequency of the communication history information, the document history information, and the access history information in the time-series relationship based on the record collected by the collecting unit. Preferably, the generated image is presented to the user.

To the end, according to another aspect of the invention, there is provided an image generating apparatus that operates in conjunction with a record system which records, for each project in which a plurality of users are involved, communication history information containing information determining a communication occurrence time point of a user involved in the project, document history information containing information determining an occurrence time point of operation on a document relating to the project, and access history information containing information determining an occurrence time point of access to the document relating to the project as distinguished from each other, and a collecting unit which collects a record concerning an attention project from the record system. The image generating apparatus includes an image generating unit that generates an image indicating a record frequency of at least one of the communication history information, the document history information, and the access history information in the time-series relationship based on the record collected by the collecting unit, and a presenting unit that presents the generated image to the user.

According to another aspect of the invention, there is provided an image generating method using a computer system that operates in conjunction with a record system which records, for each project in which a plurality of users are involved, communication history information containing information determining a communication occurrence time point of a user involved in the project, document history information containing information determining an occurrence time point of operation on a document relating to the project, and access history information containing information determining an occurrence time point of access to the document relating to the project as distinguished from each other, and a collecting unit which collects a record concerning an attention project from the record system. The image generating method includes generating an image indicating a record frequency of at least one of the communication history information, the document history information, and the access history information in the time-series relationship based on the record collected by the collecting unit, and presenting the generated image to the user.

According to still another aspect of the invention, there is provided a record medium recording a program for realizing a processing to a computer system that operates in conjunction with a record system which records, for each project in which a plurality of users are involved, communication history information containing information determining a communication occurrence time point of a user involved in the project, document history information containing information determining an occurrence time point of operation on a document relating to the project, and access history information containing information determining an occurrence time point of access to the document relating to the project as distinguished from each other, and a collecting unit which collects a record concerning an attention project from the record system. The program includes generating an image indicating a record frequency of at least one of the communication history information, the document history information, and the access history information in the time-series relationship based on the record collected by the collecting unit, and presenting the generated image to the user.

DETAILED DESCRIPTION OF THE PREFERRED EMBODIMENTS

Figure 1:
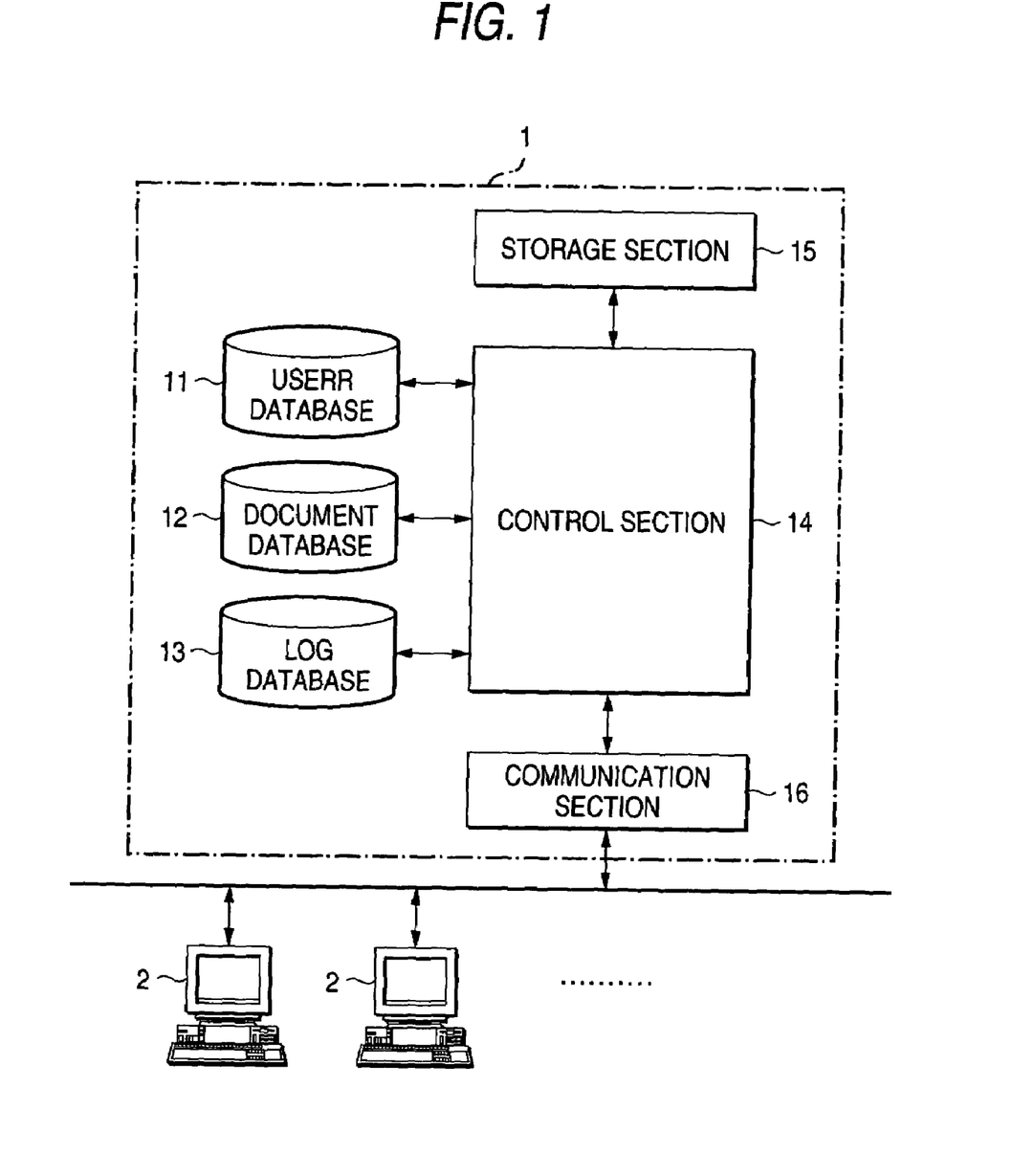
FIG. 1 is a block diagram to show a configuration example of a project management system according to an embodiment of the invention.

Referring now to the accompanying drawings, there is shown a preferred embodiment of the invention. A project management system according to an embodiment of the invention includes a server 1 and a plurality of clients 2 used by users, which are connected through a network, as an example of the system is shown in FIG. 1. The server 1 is made up of a user database 11, a document database 12, a log database 13, a control section 14, a storage section 15, and a communication section 16. In the example, each client 1 may be a personal computer.

The user database 11 of the server 1 stores user identification information (for example, user IDs), passwords, and identification information of projects in which the users are involved in association with each other. The document database 12 retains the documents used in the projects in association with the project identification information.

Figure 2:
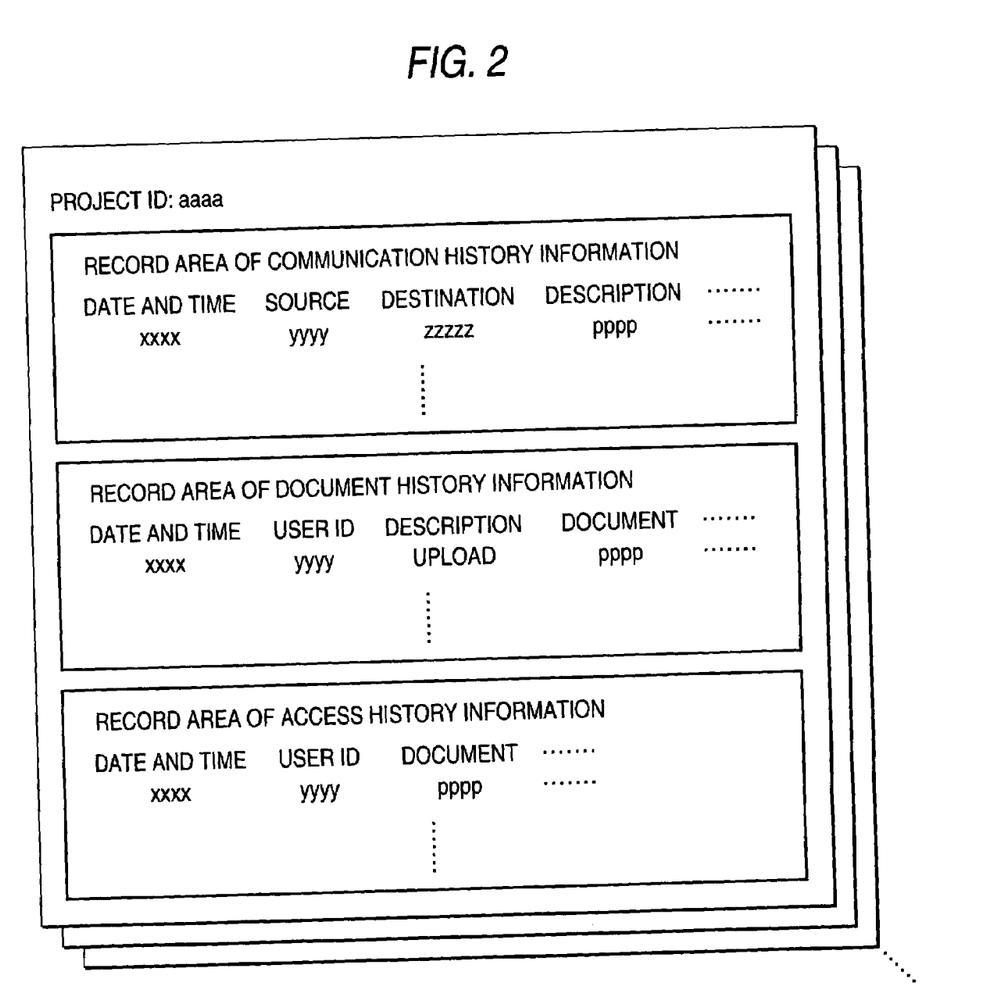
FIG. 2 is a schematic representation to show an example of the contents of a log database.

The log database 13 can record communication history information, document history information, and access history information as distinguished from each other for each project, as shown in FIG. 2, in accordance with an instruction input from the control section 14. In the description to follow, if they need not be distinguished from each other, they are simply collectively called "history information." The communication history information provides records of communications conducted among the users involved in the object, such as electronic mail sent and received by the users involved in the object, specifically records of time points at which electronic mail is sent and received (occurrence time determination information) and the contents of electronic mail (header information of destinations, sources, etc., and text containing attached files). For example, if a document is attached as the contents of electronic mail or is quoted in electronic mail (for example, using a URL, etc.), information determining the document may be previously extracted and contained in the source record of the information in the communication history information.

The document history information associates operation of the user involved in the project (registration, deletion, update, reference, etc.), the time point at which the operation was performed (occurrence time determination information), and information determining the document on which the operation is performed (objective document determination information) with each other about each document relevant for the project.

The access history information records access of the user to each document, etc., relevant for the project (document reference, etc.), specifically retains the time point at which the access was made (occurrence time determination information) and information determining the accessed document, etc.

Further, importance information may be able to be associated with at least one type of information of the communication history information, the document history information, and the access history information in accordance with an instruction input from the control section 14.

The control section 14 operates in accordance with a program stored in the storage section 15 and executes user management process for each project, document management process for each project, log record process of recording histories of communications, document operation, access, etc., process of collecting records matching the condition specified from the log in accordance with a user's instruction and generating an image using the collection result, and process as groupware for each project. The specific processing of the control section 14 is described later in detail.

The storage section 15 includes a computer-readable record medium storing programs executed by the control section 14, a record medium electrically or magnetically recording information, such as a hard disk, a CD-ROM, or a DVD-ROM, and a drive for reading information from the record medium and outputting the read information to the control section 14. The storage section 15 also includes a memory device such as RAM (random access memory) for storing data in accordance with an instruction input from the control section 14, and also operates as work memory of the control section 14. The communication section 16 transmits data through the network in accordance with an instruction input from the control section 14 and receives data coming in through the network and outputs the received data to the control section 14.

Next, the processes executed by the control section 14 will be discussed below.

[User Management Process]

In the embodiment, instructions from the users containing the user managing the server 1 (called the manager) are transmitted from the clients 2 of the users through the network to the server 1. The control section 14 authenticates the user in response to a log-in request from the client 2 received through the network and after authenticating the user, accepts an instruction concerning each process described later in response to an instruction from the user.

The user authentication processing can be accomplished specifically as follows: A web page describing a log-in screen for prompting the user to enter the user ID and the password is transmitted to the client 2, the user ID and the password entered using the interface on the web page are received as a query, when the received user ID and password match the user ID and the password stored in the user database 11, the authentication is determined to be successful, and a cookie, etc., having a predetermined value is transmitted to the client 2 of the user and then the session is managed using the cookie.

Here, the server 1 is accessed from the client 2 using a web browser byway of example. However, to install dedicated application in the client 2, any other authentication method than the method as described above may be adopted. For example, a method of using an IC card is available. That is, a different key is previously issued to each other and is stored in an IC card. The key rather than the password is stored in the user database 11 in association with the user ID. If the user operates the client 2 so as to log in to the server 1 using the key recorded on the IC card, the client 2 uses a public key previously registered for the server 1 (called server public key) to encrypt the key recorded on the IC card, and transmits the encrypted key to the server 1. The server 1 receives the transmitted encrypted key, decodes the encrypted key with the secret key corresponding to the server public key (server secret key) to take out the key, and searches the user database 11 for the taken-out key. When the search is successful, it is assumed that the user having the user ID associated with the key from the user database 11 logs in to the server 1.

In the description of the processes of the control section 14 to follow, to accept an instruction from the user, the user giving the instruction is the authenticated user unless otherwise specified.

[User Information Management]

Here, the information on the user ID, the password, the project in which the user is involved, etc., is used as the information relevant for the user by way of example. However, in addition, the user information may include the profile of the user, namely, keyword information on the user based on the documents associated with the user, such as information concerning the personal specialism and history and the material created by the user.

Specifically, as an example of the keyword information on the user based on the documents, etc., morphological analysis is conducted on the document created by the user, and a keyword relevant for the document is extracted using morpheme frequency information, etc., and is associated with the user ID in the user database 11. As another example, the document (or the result of morphological analysis on the document as described above (namely, index information, etc.) or document reference information (URL, etc.)) may be associated with the user ID in the user database 11.

The information concerning the profile of the user can be used for technique called KnowWho wherein upon reception of a search condition and a search instruction of another user from one user, the control section 14 searches for the user associated with the profile information matching the search condition.

[Document Management Process]

The control section 14 performs document management process and processes upload and download instructions of a document. In the embodiment, each document is associated with any project for storage in the document database 12. That is, to upload a document, the user transmits information specifying the document and information specifying which project the document is to be uploaded into (project specification information) to the server 1 as an upload instruction.

Upon acceptance of the upload instruction of the document from the user, the control section 14 acquires the specified document from the client 2 of the user and stores the document in the document database 12 in association with project identification information (project ID) specified by the projection specification information contained in the upload instruction.

At this time, the control section 14 generates history information relating to the upload and records the history information in the log database 13. (See log record process described later.)

Upon acceptance of the download instruction of the document stored in the document database 12 from the user, the control section 14 reads the document specified in the instruction from the document database 12 and distributes the document to the user.

Further, the control section 14 references the project ID associated with the document specified in the instruction and references the user database 11 to check whether or not the user giving the download instruction is involved in the project identified by the project ID. If the user is not involved in the project (namely, if the user not belonging to the project accesses the document relating to the project), the control section 14 records the download instruction in the access history information as access from outside the project. (See log record process described later.)

[Process Concerning Communications]

The control section 14 also conducts the process for enabling communications between the users. In the process, a message, a document, stream data of video, audio, etc., and any other information are transferred between the users according to electronic mail transmission-reception processing (using an SMTP sever, a POP server, etc.) and a message board (using a web server and a CGI program in combination or using NNTP (Net-News Transfer Protocol)), for example.

For example, when electronic mail is transmitted from one user (source user) to another user (destination user), the control section 14 records the user IDs of the source user and the destination user, the transmission time point, etc., (that can be extracted from the header information), and electronic mail text information (containing information of an attached file) in the log database 13 as the communication history information. At this time, for example, if a character string representing a URL is contained in the electronic mail text and indicates a document in the document database 12, the information determining the indicated document may be associated with the communication history information concerning the electronic mail for storage in the log database 13.

[Log Record Process]

The control section 14 records the history information concerning the processes described above in the log database 13. In the embodiment, the log database 13 can record the communication history information, the document history information, and the access history information as distinguished from each other for each project as described above, and the control section 14 records the history information as distinguished from each other. The history information will be discussed below by taking history information recording process as an example.

(1) Communication History Information

To begin with, the communication history information is information associating the time point at which communications between the users were conducted and the information concerning the communication detail with each other, specifically information containing the user IDs of the source user and the destination user, the transmission time point, etc., (that can be extracted from the header information), and electronic mail text information (containing information of an attached file) if electronic mail is applied, as described above. The control section 14 records the communication history information in the communication history information storage area in the log database 13. At this time, the control section 14 may store the communication history information associated with the project to which the source user belongs and the project to which the destination user belongs. In this case, to prevent storing of duplicate communication history information, for example, a unique identifier may be assigned to each piece of communication history information for storage for each project (so that the communication history information assigned the same identifier in the same project is not stored).

Only when the source user and the destination user belong to the same project, the control section 14 may store the communication history information in association with the project. In this case, for example, if the source user and every destination user belong to different projects, the communication history information relating to the electronic mail is not recorded.

Likewise, if electronic mail is broadcasted rather than transmitted to a specific user, the communication history information relating to the electronic mail may be unrecorded.

(2) Document History Information

The document history information provides records concerning upload, download, etc., of each document. For example, upon reception of an upload instruction of one document, the control section 14 generates a record containing upload time point information of the document (acquired from a calendar (not shown)), information determining the document, and the user ID of the user giving the upload instruction of the document as the document history information. The control section 14 records the generated document history information in the document history information storage area in the log database 13 in association with the identification information of the project associated with the user (project ID).

(3) Access History Information

The access history information is generated when the user downloads a document, etc., as described above. The user may be the user in the project relating to the document or may be the user outside the project (user not involved in the project). Further, the access history information may be generated only when the user outside the project downloads a document, etc. Specifically, the control section 14 acquires the project ID associated with the downloaded document about such a download instruction, generates access history information containing the download instruction time point and information of determining the downloaded document, and records the generated access history information in the access history information storage area in the log database 13 in association with the acquired project ID. In the description, document access is taken as an example, but when access to a communication message such as the electronic mail contents or the message board contents is made, the access history information may also be generated.

[Record of Importance Information]

Importance information indicating the importance of the history information may be associated with at least some of the communication history information, the document history information, and the access history information thus recorded in the log database 13 for record. The importance information is, for example, information representing the importance by a numeric value; history information with which no importance information is associated may be set to importance "0" and the importance may be represented in five steps, etc., of evaluation. Alternatively, the importance of communications or documents may be defined based on the frequency. For example, the value representing the record frequency, such as the number of access times, may be used intactly as the value of the importance or the numbers of access times, etc., may be classified using a plurality of threshold values and the importance may be represented stepwise, for example, in five steps of evaluation.

The importance information may be changed, for example, as the project ID associated with the history information with which the importance information is associated is referenced and further an instruction issued from the user involved in the project identified by the project ID (particularly, the manager) is followed. The user referencing the history information of the project may be requested to enter the evaluation point and the importance may be determined based on the entered evaluation point. The importance information thus associated with the history information can be used in information providing process described later.

[Storyboard Image Generation Process]

The embodiment is characterized by the fact that the control section 14 generates an image for efficiently analyzing the history information based on the history information (storyboard image).

Specifically, upon acceptance of an instruction to the effect that a specific project is specified as the attention project from the user, the control section 14 searches the log database 13 for the history information associated with the project ID of the specified attention project (which corresponds to an example of condition of the invention) and collects the history information (collection process) and stores the history information in the storage section 15.

The control section 14 generates an image (storyboard image) indicating the record frequency of the history information in the time-series relationship based on the collected history information stored in the storage section 15. The generated storyboard image is combined with a screen provided by groupware process described later and is provided for the user. Several examples of the storyboard image will be discussed. For example, the following modes of the storyboard image are possible.

(1) Example of Using Time Lines

Figure 3A:
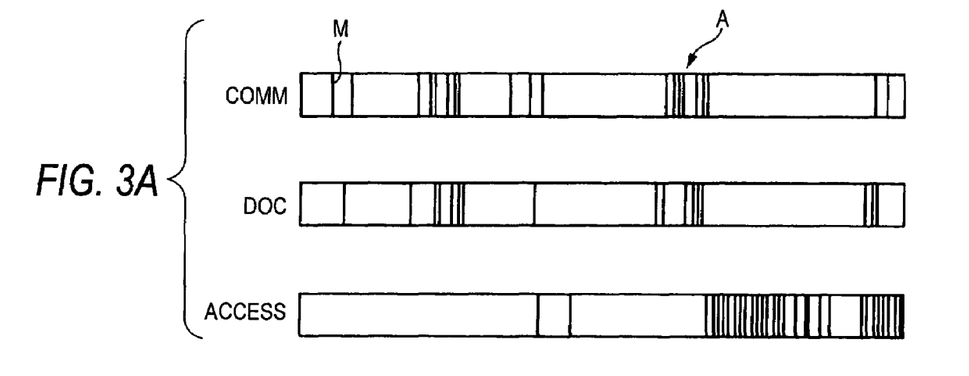
FIGS. 3A and 3B are schematic representations to show examples of storyboard image.

That is, one mode of the storyboard image uses bars representing the time passage (time lines). As shown in FIG. 3A, for the communication history information, the document history information, and the access history information, the corresponding time lines (Comm for the communication history information, Doc for the document history information, and Access for the access history information) are drawn separately. The left end of each time line is the project start time (the time point at which the project ID was registered in the server 1 or the like) and the right end is the current time (if completion of the project is not registered) or the projection completion time (the time point at which completion of the project was registered in the server 1 or the like). While the collected history information stored in the storage section 15 is referenced in order, a predetermined marker M is drawn at the position corresponding to the record time point of the history information (namely, the time point contained in the history information) on the corresponding time line to generate a storyboard image. The marker M can be a line orthogonal to the time axis of the time line. Specifically, letting the left end of the display coordinates (x axis) of the time line be xs and the right end be xe, the marker M corresponding to the history information occurring at time t (where tps<t<tpe) is displayed at the position of (xe−xs)/(tpe−tps)xt+xs on the x axis, where tps is the project start time and tpe is the current time point if the project is not complete or the project completion time point if the project is complete.

Consequently, for example, the time at which communications frequently occurred, the time at which documents were registered one after another, or the like can be recognized as the markers M are drawn intensively (for example, FIG. 3A).

In this case, pieces of history information different in importance information may be displayed in different modes of markers M. For example, the markers M different in color can be used in response to the importance information.

When information specifying time point ts corresponding to the start point of the time line and time point te corresponding to the end point of the time line is accepted from the user, the control section 14 may draw a time line with the specified start point as the left end and the specified end point as the right end and draw markers M corresponding only to the history information occurring at the time interval between the time point specified as the start point and the time point specified as the end point on the time line. In doing so, a storyboard image as the specified portion is zoomed can be provided. In this case, letting the left end of the display coordinates (x axis) of the time line be xs and the right end be xe, the marker M corresponding to the history information occurring at time t (where ts<t<te) is displayed at the position of (xe−xs)/(te−ts)xt+xs on the x axis.

Further, an instruction from the user may be accepted and a link marker indicating the relationship between different types of history information (dashed line in FIG. 3B) may be displayed. The link marker relates the communication history information and the document history information relating to the document referenced in the communications relating to the communication history information to each other. For example, if a URL to a document is associated in electronic mail as communications, the electronic mail and the document history information relating to the document identified by the URL are associated with each other.

Figure 3B:
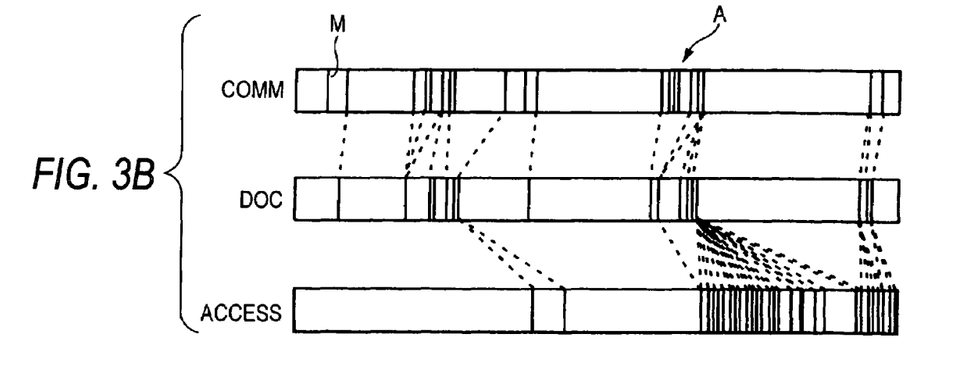

Likewise, FIG. 3B also shows a link marker for associating access history information and the document history information relating to the document referenced in the access with each other.

The link markers enable the user not only to understand what documents are the central topic of communications and are often referenced also by the users outside the project, but also to understand what documents received attention at each time point in time sequence.

Further, an instruction for displaying the corresponding history information may be associated with each marker M and when the storyboard image shown in FIGS. 3A and 3B is presented to the user, if the user performs operation of specifying any marker (for example, clicks on the marker), an instruction for displaying the description of the history information associated with the marker may be transmitted to the server 1.

For example, upon reception of an instruction associated with a marker relating to communication history information, the control section 14 presents the descriptions of the communication history information, namely, the time point, the source user, the destination user, and the description of communications in character strings, etc., to the user in accordance with the instruction. Upon reception of an instruction associated with a marker relating to document history information, the control section 14 presents the document specified in the information specifying the document contained in the document history information relating to the marker to the user giving the instruction in accordance with the instruction.

The time lines corresponding to each type of history information are common to each other in the position coordinates of both ends and the time point represented by the coordinates and if the time lines are crossed by an orthogonal line in the time axis direction, the time point indicated by the intersection point of the line and one time line and those indicated by the intersection point of the line and another time line become the same (namely, the time lines are placed in the positions synchronized with each other), but any other mode may be adopted. For example, the right end coordinates of the time line relating to the access history information may represent the current time point although the project is already complete.

(2) Example of Using Comic Format

The control section 14 may generate not only a storyboard image using the time lines, but also a storyboard image of frame layout as comic by arranging rendering images of front pages of documents referenced at main points in time (for example, D in FIG. 4) in time sequence (FIG. 4) as described below. In this case, the size of the rendering image of each document may be changed in response to the importance information.

Figure 4:
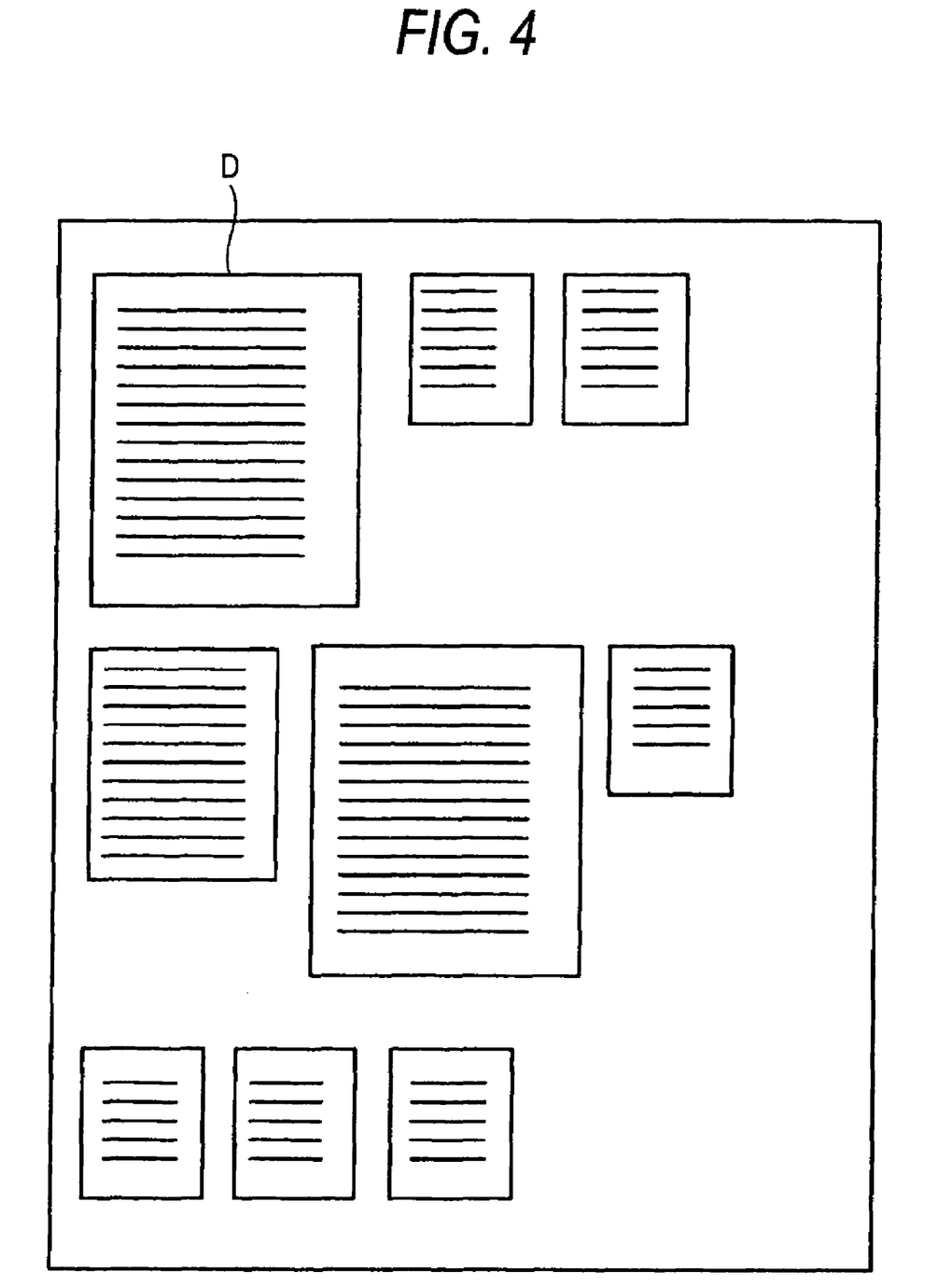
FIG. 4 is a schematic representation to show another example of storyboard image.

Specifically, the control section 14 selects the document to be rendered as each frame in the comic format by the following method: The control section 14 totalizes the record frequency of communication history information every unit time period, determines the time period over which the record frequency of the communication history information exceeds a predetermined threshold value (high-frequency time period) based on the result of the totalizing, determines the document referenced in communications represented by the communication history information in the determined high-frequency time period, and selects the determined document. For example, the most frequently referenced document may be selected from among the documents referenced in communications represented by the communication history information in the high-frequency time period.

Likewise, the control section 14 totalizes the record frequency of access history information every unit time period, determines the high-frequency access time period over which the record frequency of the access history information exceeds a predetermined threshold value based on the result of the totalizing, and selects the document subjected to access relating to the access history information in the determined high-frequency access time period. For example, the most frequently accessed document may be selected from among the documents subjected to access relating to the access history information in the high-frequency access time period.

The control section 14 selects at least one of the documents referenced and accessed in the high-frequency time period about the communication history information and the access history information, acquires the selected document from the document database 12, renders, for example, the front page of the document (as image data such as a bit map), and arranges the image of the rendering result. In the arrangement order, the images may be laid out like a line from the upper-left corner to the right, for example, and if a predetermined width is exceeded, the remaining images may be laid out on the next line from the left to the right.

In the description, rendering of only the front pages is taken as an example, but the documents may be converted into complex electronic documents as in PDF or DocuWorks™ format and image in which the electronic documents are laid out may be provided. To do this, for example, a technique of distributing DocuWorks Disk™ of DocuWorks™ through a web server can be used to distribute a storyboard image to the user.

(3) Example of Using an Axis Other than Time-series Axis

Figure 5:
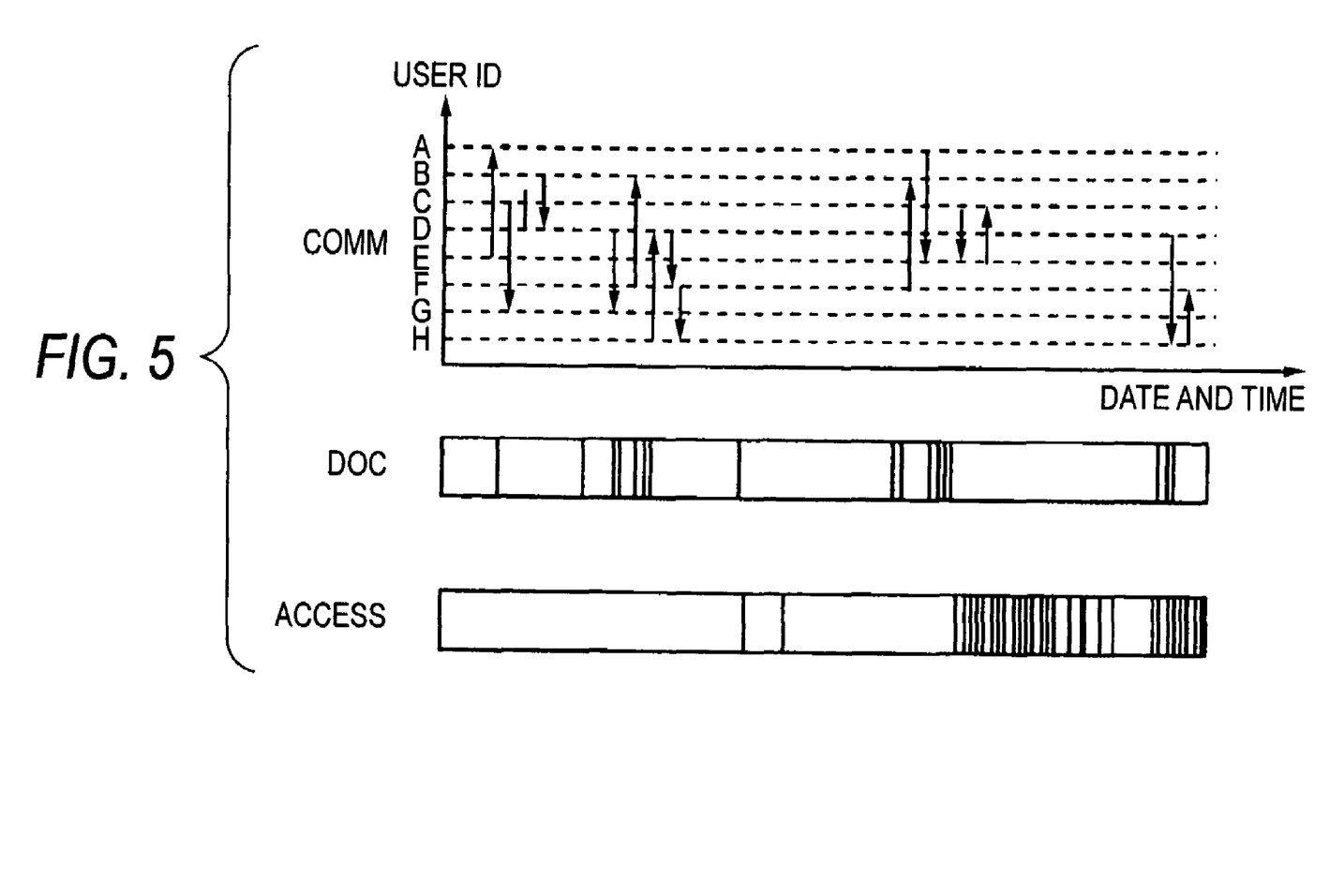
FIG. 5 is a schematic representation to show still another example of storyboard image.

Instead of the time lines described above, markers corresponding to history information may be drawn in a two-dimensional space provided according to the user IDs and the time to generate a storyboard image. For example, as shown in FIG. 5, to represent communication history information in the two-dimensional space provided according to the user IDs and the time, each marker is an arrow from the source user to the destination user, whereby viewability as to whom active activity is conducted between is enhanced.

In addition, if the location of each user (for example, office) is previously registered in the user database 11, it is made possible to represent the communication history information in the space provided according to the user locations and the time.

Likewise, a different axis may be used in response to the type of history information in such a manner that two axes of the data size and the time are used to represent document history information if the type of history information is document history information.

[Explicit Record by User]

The user relating to history information may be enabled to associate comment information with the history information. For example, if the user specifies one piece of history information (for example, by clicking on the marker associated with the history information) and enters comment information to be associated with the specified history information, the control section 14 associates the entered comment information with the specified history information for storage in the log database 13.

When the user performs predetermined operation (for example, operation of superposing a mouse pointer on one of the markers M) for any history information on the screen where the storyboard image shown in FIGS. 3A and 3B is displayed, for example, the comment information associated with the history information for which the predetermined operation is performed may be displayed; the display may be pop-up display.

Further, the comment information may be classified into items of user ID group, location, time point, description, reason, and method, means (namely, 5W1H (Who, Where, When, What, Why, How)) for registration.

[Groupware Process]

The control section 14 performs groupware process to provide a screen for displaying the situation in the project containing the storyboard image thus generated and provide an interface for communications among the users in and outside each project. The groupware screen is provided for the user through the web server, for example.

Figure 6:
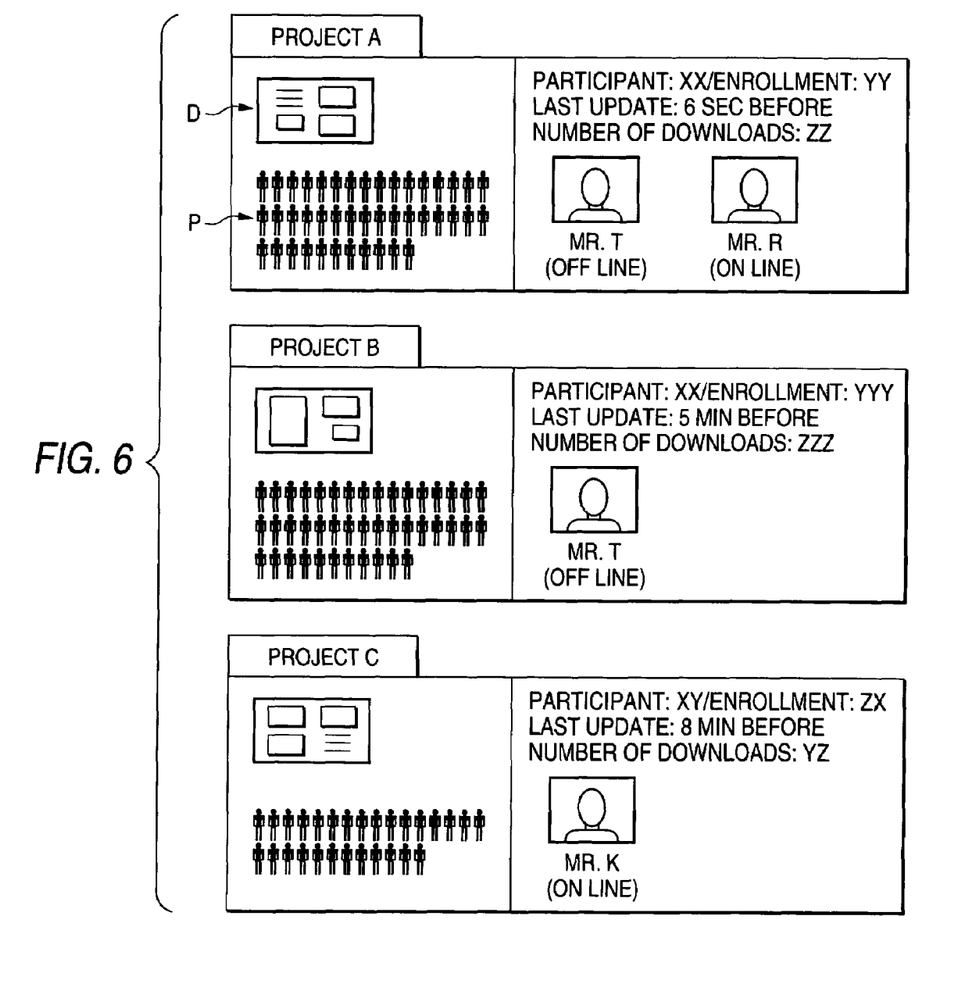
FIG. 6 is a schematic representation to show an example of a listing of projects.

The control section 14 first displays a listing of communities as a portal screen, as shown in FIG. 6. In the image corresponding to each project, the persons belonging to the project are represented by icons (P) and the rough number of the users involved in the project can be grasped. The screen displays the current number of participants, the last update time (last history information registration time point, etc.), the cumulative value of the number of document download times, a photograph of the face of the representative user of the users involved in the project (for example, a photograph of the face of the manager), and the rendering image (D) of the last document uploaded into the project. The projects may be listed in the update time order.

Figure 7:
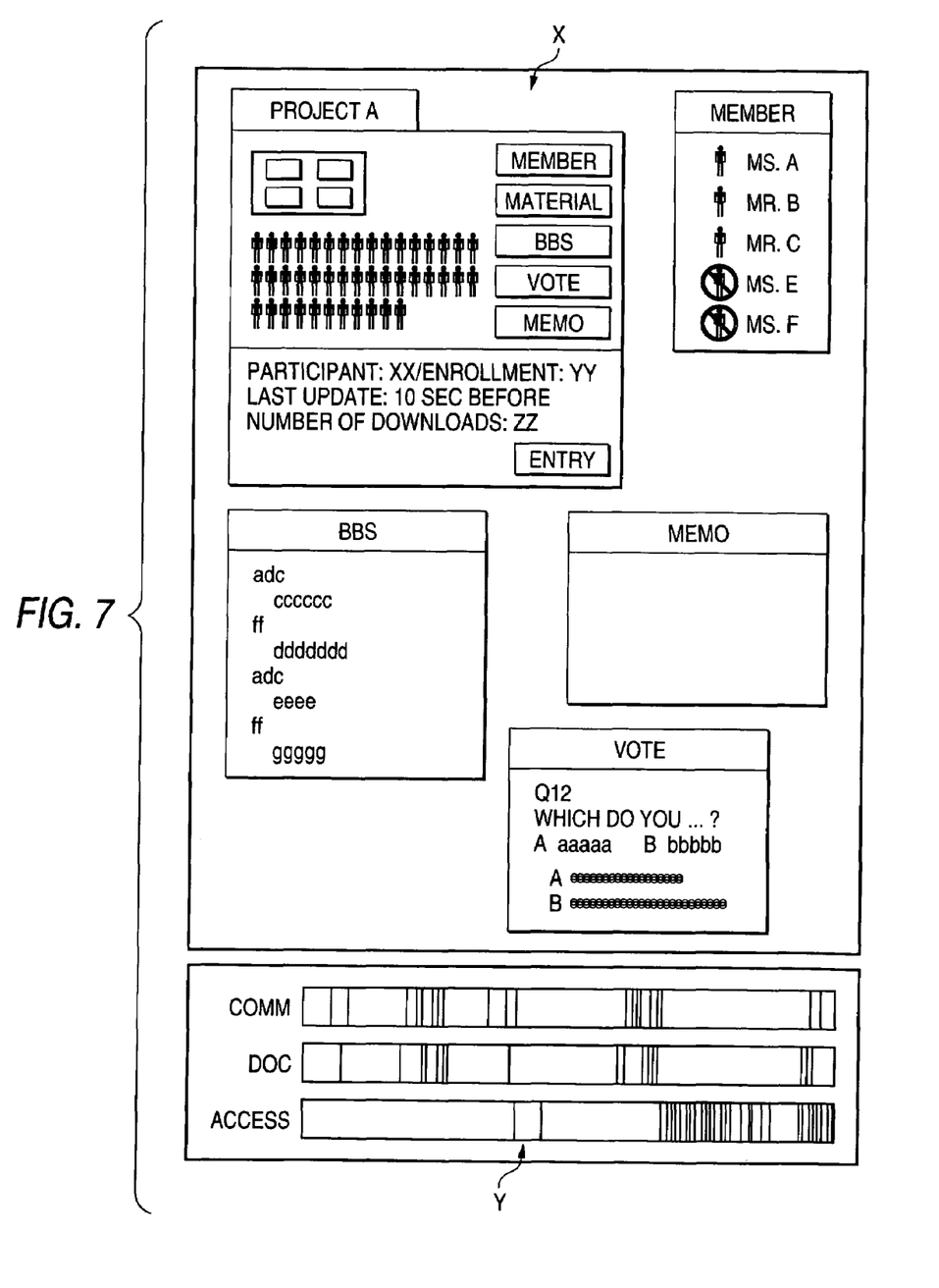
FIG. 7 is a schematic representation to show an example of a groupware screen for each project.

When the user selects any of the projects, the control section 14 reads various pieces of data relevant for the project from a project database (not shown), displays a window screen (project status screen) for display various pieces of information (X), and displays a storyboard image generated based on the history information by the above-described process (Y), as shown in FIG. 7. The images are represented on one unity screen, but may be displayed in separate windows.

[Specified Time State Screen]

A cursor movable in the time series direction may be displayed on a storyboard image and a project status screen at the point in time point corresponding to the position of the cursor may be displayed with move operation of the cursor. For example, if the number of the users involved in the project at the time point corresponding to the position of the cursor is smaller than the number of the users at present, the number of the icons corresponding to the users decreases.

[Process Involved in Project Integration and Division]

Further, in the actual project activities, the projects can be integrated or divided. A small-scaled project (subproject) can also be formed in one project. In these cases, for example, to integrate the projects, after the integration time point, the project ID of a new formed (post-integrated) project is associated with the project IDs of the integrated projects for storage in the project database (not shown). In the process of generating a storyboard image, to collect history information, the history information relating to the post-integrated project ID and the history information relating to the pre-integrated project IDs associated with the post-integrated project ID are collected. Accordingly, the storyboard images before and after integration are combined to generate a storyboard image as illustrated in FIGS. 3A and 3B, etc.

Figure 8:
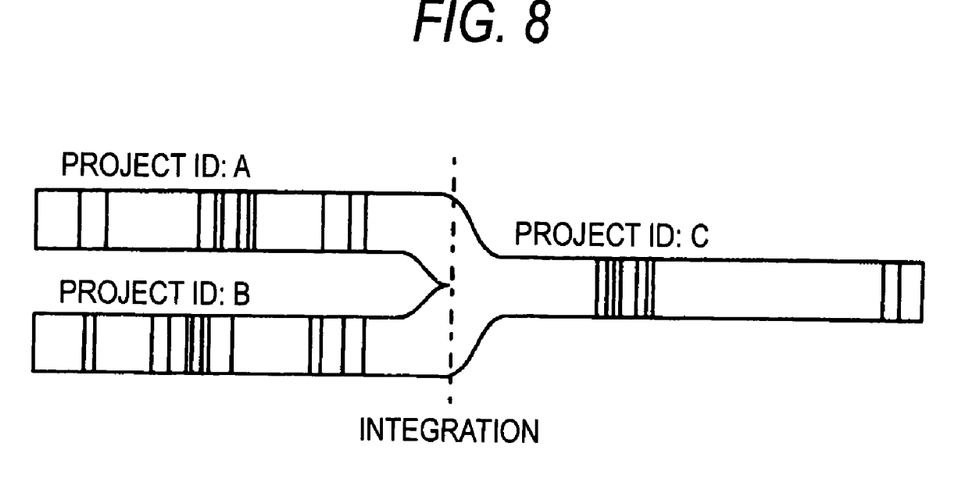
FIG. 8 is a schematic representation to show an example of a storyboard image when projects are integrated.

When the history information is collected, the collected history information may be classified according to user ID for storage in the storage section 15. Specifically, when the project with the project ID "A" and the project with the project ID "B" are integrated into a new project "C," the history information of the "A" project, the history information of the "B" project, and the history information of the "C" project are stored in separate areas. In this case, to generate a storyboard image, it may be displayed in a mode in which the pieces of the history information of the projects can be distinguished from each other. For example, the pieces of the history information of the projects maybe displayed indifferent colors on one time line. As an instruction specifying at least one project ID is received, only the history information relating to the project ID specified in the instruction may be displayed on the time line. Further, the time lines may be drawn like a true for distinguishing the pieces of the history information of the projects from each other (FIG. 8).

To divide one project, the project ID of the pre-divided project and the project IDs of post-divided projects can also be associated with each other for storage in the project database, and similar processing to that in the integration described above can be performed.

To integrate the projects, the control section 14 may extract sets of the users relating to the pre-integrated project IDs associated with the project ID from the user database 11 as a list of the users involved in the post-integrated project as the union of the sets without changing the data in the user database 11. Similar processing to the document database can be performed.

To divide one project, the user database 11 is updated, the users are assigned to new formed (post-divided) projects, and a new post-divided project ID is associated with each user. In the document database 12, copies of each document relating to the pre-divided project are made as many as the number of divisions (for example, to divide the project into three projects, three). For example, to divide the project into three projects, two copies of each document relating to the pre-divided project are made to provide the same three documents in total. The control section 14 associates the post-divided project IDs with the original and its copies for each document. Accordingly, each new formed (post-divided) project succeeds to all documents of the original (pre-divided) project.

Further, to generate a subproject, a new project ID is issued to the subproject and is associated with the project ID of the parent object (including the subproject), and the subproject is stored in the project database. Similar collection processing to that described above is performed and a storyboard image is generated.

[Operation]

The operation of the project management system according to the embodiment of the invention is as follows: The user conducts activities in the project while accessing the server 1 using mail software, a web browser, etc., from the client 2, transmitting electronic mail to any other user, uploading a document shared with any other user, etc.

For example, in one product development project, assume that since a technical problem for miniaturizing the product occurred before a detailed design was complete after the initial product plan document was uploaded, electronic mail describing ideas about miniaturization was frequently transferred among the users involved in the project and a large number of design plans were uploaded and then one idea described in one publication of patent applications was adopted for solving the problem for miniaturizing the product and the final design was complete. The success example assumes that the users involved in other projects also referenced the information concerning the project and a large number of users accessed the design document.

In this case, a large number of pieces of communication history information were recorded about just before the time point of uploading the final design and a large number of design plan documents were uploaded before the final design was complete and therefore a large number of pieces of document history information are recorded at the time. After the final design was complete, the number of records of the communication history information also decreases and the number of records of the document history information also decreases. Further, the access history information grows gradually from one time point.

To display link markers as shown in FIG. 5, the document history information and the communication history information relating to the design plans are displayed in association with each other, and the access history information is displayed in association with the final design.

Now, if one facilitator is asked if effective knowledge of a solution to a technical problem proper to another project is available, the facilitator searches for records on product development project, for example. Hitherto, the facilitator has had to reference the whole of the history information concerning each project. However, the server in the embodiment enables the facilitator to display a groupware screen for the product development project (for example, FIG. 7), know frequent registration of the design plans using storyboard images in the comic format, and understand that some solution to the technical problem was made. Then, when the facilitator displays the storyboard image using time lines and references the times corresponding to the design plans, for example, if the facilitator examines some communications just before the final design, he or she understands that electronic mail describing the information of the publication of patent application disclosing the idea adopted for the final design is transferred, and can acquire the knowledge that patent documents are useful for solving technical problems.

It is made possible to acquire knowledge in such a chain manner that if the user involved in another object taking an interest in a similar problem is found from the access history information, the history information of the project in which the user is involved is referenced about the user relating to the access history information.

According to the embodiment, the job of the dedicated facilitator can be thus supported. When the user searches for the past record instead of the dedicated facilitator, the operation is also facilitated.

The knowledge acquisition example described here is only an example of indicating the effect produced by understanding the activities of one project in a story using storyboard images.

[Modification]

The project management system has been described using the server client model. However, for example, if each of the clients 2 holds documents and history information and operates a server program for providing the document and the history information (relating to the attention project ID) in response to a request from another client 2, the project management system can be installed even if the model is a peer-to-peer model. That is, the example of the server 1 is only one example of specific installation of the invention, and the project management system can be installed in such a manner that only a part of the server 1 is installed and other portions are executed in the clients 2.

What is claimed is:

1. A project management system, comprising:
   a document database that stores a plurality of documents relating to a plurality of projects;
   a recording unit that automatically records a communication history for each project, a document history for each project and an access history for each project, which are separate from each other, wherein:
   a plurality of users are involved in each project,
   the communication history for each project contains records that identify an occurrence in time of any communication by at least one of the plurality of involved users with another at least one of the plurality of involved users, the document history for each project contains records that identify an occurrence in time of any operation on any document relating to each project, and the access history for each project contains records that identify an occurrence in time of any access to any document relating to each project;

a collecting system that retrieves a record of a selected project from the recording unit;

an image generating unit that generates, based on the retrieved record of the selected project, an image separately showing a record frequency of the records in the communication history of the selected project, a record frequency of the records in the document history of the selected project and a record frequency of the records in the access history of the selected project in a time series relationship, wherein the image generating unit summarizes the record frequencies during a predetermined time period, determines a time period over which the record frequencies exceed a predetermined threshold value based on the summary, identifies an accessed document referenced in at least one of the communication history, document history and access history within the determined time period, arranges the generated image representing the document in relation to the time-series relationship; and a display unit that displays the generated image regarding the selected project.

2. The project management system according to claim 1, further comprising an importance value associating unit that associates an importance value with at least a portion of the communication history, the document history and the access history in the recording unit, wherein the image generating unit generates, and the display unit displays, images related to documents regarding the selected project, the generated images related to individual documents being displayed differently based on the importance value.

3. The project management system according to claim 2, wherein the importance value is determined based on the record frequency.

4. The project management system according to claim 2, wherein the importance value is determined based on a project management system user input.

5. The project management system according to claim 1, the recording unit that further automatically records a user identification history for each project, wherein the user identification history for each project contains records that identify an occurrence in time of any user involved in the project.

6. An image generating apparatus that operates in conjunction with a document database, a recording unit and a collection system, comprising:

the document database stores a plurality of documents relating to a plurality of projects, the recording unit that automatically records a communication history for each project, a document history for each project and an access history for each project, which are separate from each other, wherein:

a plurality of users are involved in each project, the communication history for each project contains records that identify an occurrence in time of any communication by at least one of the plurality of involved users with another at least one of the plurality of involved users, the document history for each project contains records that identify an occurrence in time of any operation on any document relating to each project, and the access history for each project contains records that identify an occurrence in time of any access to any document or any communication relating to each project, and the collecting system that retrieves a record of a selected project from the recording unit, the image generating apparatus comprising an image generating unit that generates, based on the retrieved record of the selected project, an image separately showing a record frequency of the records in the communication history of the selected project, a record frequency of the records in the document history of the selected project and a record frequency of the records in the access history of the selected project in a time-series relationship, wherein the image generating unit summarizes the record frequencies during a predetermined time period, determines a time period over which the record frequencies exceed a predetermined threshold value based on the summary, identifies an accessed document referenced in at least one of the communication history, document history and access history within the determined time period, arranges the generated image representing the document in relation to the time-series relationship; and a display unit that displays the generated image regarding the selected project.

7. The image generating apparatus according to claim 6, wherein an importance value is associated with at least a portion of the communication history for each project, the document history for each project and the access history for each project in the recording unit, and the generated image includes images related to documents regarding the selected project, images related to individual documents being displayed differently based on the importance value.

8. The image generating apparatus according to claim 6, wherein the generated image comprises at least a time line for the selected project, predetermined markers on the time line at positions corresponding to record time points of at least one of the communication history, the document history, and the access history.

9. The image generating apparatus according to claim 7, wherein the importance value is determined based on a project management system user input.

10. The image generating apparatus according to claim 6, the recording unit that further automatically records a user identification history for each project, wherein the user identification history for each project that contains records that identify an occurrence in time of any user involved in the project.

11. A project management method for facilitating access to documents regarding a plurality of projects stored in a document database, the method comprising:

recording a communication history for each project, a document history for each project and an access history for each project, which are separate from each other, wherein:

a plurality of users are involved in each project, the communication history for each project contains records that identify an occurrence in time of any communication by at least one of the plurality of involved users with another at least one of the plurality of involved users;

the document history for each project contains records that identify an occurrence in time of any operation on any document relating to each project; and the access history for each project contains records that identify an occurrence in time of any access to any document relating to each project;

retrieving a record of a selected project from the recording unit;

generating an image, based on the retrieved record of the selected project, separately showing a record frequency of the records in the communication history of the selected project, a record frequency of the records in the document history of the selected project and a record frequency of the records in the access history of the selected project in a time-series relationship, wherein generating an image includes summarizing the record frequencies during a predetermined time period, determining a time period over which the record frequencies exceed a predetermined threshold value based on the summary, identifying an accessed document referenced in at least one of the communication history, document history and access history within the determined time period, arranging the generated image representing the document in relation to the time-series relationship; and displaying the generated image regarding the selected project.

12. A computer-readable medium containing a program for instructing a computer system to execute a method for project management, the method comprising:

recording a communication history for each project, a document history for each project and an access history for each project, which are separate from each other, wherein:

a plurality of users are involved in each project, the communication history for each project contains records that identify an occurrence in time of any communication by at least one of the plurality of involved users with another at least one of the plurality of involved users;

the document history for each project contains records that identify an occurrence in time of any operation on any document relating to each project; and the access history for each project contains records that identify an occurrence in time of any access to any document relating to each project;

retrieving a record of a selected project from the recording unit;

generating an image, based on the retrieved record of the selected project, separately showing a record frequency of the records in the communication history of the selected project, a record frequency of the records in the document history of the selected project and a record frequency of the records in the access history of the selected project in a time-series relationship, wherein generating an image includes summarizing the record frequencies during a predetermined time period, determining a time period over which the record frequencies exceed a predetermined threshold value based on the summary, identifying an accessed document referenced in at least one of the communication history, document history and access history within the determined time period, arranging the generated image representing the document in relation to the time-series relationship; and displaying the generated image regarding the selected project.

13. The computer-readable medium containing the program for instructing the computer system to execute the method for project management according to claim 12, further comprising recording a user identification history for each project, wherein the user identification history for each project contains records that identify an occurrence in time of any user involved in the project.

14. The project management method according to claim 11, further comprising recording a user identification history for each project, wherein: the user identification history for each project that contains records that identify an occurrence in time of any user involved in the project.

15. The project management method according to claim 11, further comprising associating an importance value with at least a portion of the communication history for each project, the document history for each project and the access history for each project, and generating and displaying generated images related to documents regarding the selected project, the generated images related to individual documents being displayed differently based on the importance value.

16. The project management method according to claim 15, wherein the importance value is determined based on the record frequency.

17. The computer-readable medium containing the program for instructing the computer system to execute the method for project management according to claim 11, further comprising associating an importance value with at least a portion of the communication history for each project, the document history for each project and the access history for each project, and generating and displaying generated images related to documents regarding the selected project, the generated images related to individual documents being displayed differently based on the importance value.

18. The computer-readable medium containing the program for instructing the computer system to execute the method for project management according to claim 17, wherein the importance value is determined based on the record frequency.

* * * * *